(12) United States Patent
Vanthournout (10) Patent No.: US 9,417,615 B2
(45) Date of Patent: Aug. 16, 2016

(54) DEMAND RESPONSE ADAPTOR FOR CONNECTING A DEVICE TO A DEMAND RESPONSE SYSTEM OR HOME AUTOMATION SYSTEM

(71) Applicant: VLAAMSE INSTELLING VOOR TECHNOLOGISCH ONDERZOEK (VITO), Mol (BE)

(72) Inventor: Koen Vanthournout, Mol (BE)

(73) Assignee: VLAAMSE INSTELLING VOOR TECHNOLOGISCH ONDERZOEK (VITO), Mol (BE)

( * ) Notice: Subject to any disclaimer, the term of this patent is extended or adjusted under 35 U.S.C. 154(b) by 560 days.

(21) Appl. No.: 13/744,028

(22) Filed: Jan. 17, 2013

(65) Prior Publication Data

US 2013/0184881 A1    Jul. 18, 2013

(30) Foreign Application Priority Data

Jan. 17, 2012    (EP) .................................... 12151471

(51) Int. Cl.
    *G05B 13/02*    (2006.01)
    *H02J 3/14*     (2006.01)
    *G05B 15/02*    (2006.01)

(52) U.S. Cl.
    CPC .............. *G05B 13/02* (2013.01); *G05B 15/02* (2013.01); *H02J 3/14* (2013.01); *G05B 2219/2642* (2013.01); *H02J 2003/143* (2013.01); *H02J 2003/146* (2013.01); *Y02B 70/3225* (2013.01); *Y02B 70/3241* (2013.01); *Y02B 70/3266* (2013.01); *Y04S 20/222* (2013.01); *Y04S 20/224* (2013.01); *Y04S 20/227* (2013.01); *Y04S 20/242* (2013.01)

(58) Field of Classification Search
    None
    See application file for complete search history.

(56) References Cited

U.S. PATENT DOCUMENTS 5,956,462 A      9/1999  Langford
2010/0286841 A1* 11/2010 Subbloie .................... 700/295
(Continued)

FOREIGN PATENT DOCUMENTS

WO    2011064671 A2    6/2011

OTHER PUBLICATIONS

Iwayemi et al. 'Knowing When to Act: An Optimal Stopping Method for Smart Grid Demand Response', IEEE Network, IEEE (2011), p. 47.*

(Continued)

*Primary Examiner* — Mohammad Ali
*Assistant Examiner* — Bernard G Lindsay
(74) *Attorney, Agent, or Firm* — Sughrue Mion, PLLC (57) ABSTRACT

Demand response adaptor provided such that, depending on the device connected to the demand response adapter, the demand response control system can be provided with the second constraints corresponding to the device connected to the demand response adapter, wherein the demand response control system comprises software components for making the decision based on the first constraints, the second constraints and the third constraints, wherein the controller comprises software components for detecting the start of a program by analyzing the amount of electrical power used by the device in function of time detected by the sensor and wherein the controller of the adaptor comprises software components for switching the relay to the nonconductive state when the start of the program is detected until, based on the decision of the demand response control system, the controller switches the relay switch to the conductive state.

18 Claims, 3 Drawing Sheets

(56) References Cited

U.S. PATENT DOCUMENTS

| | | | |
|---|---|---|---|
| 2011/0196547 A1* | 8/2011 | Park et al. | 700/296 |
| 2011/0234017 A1* | 9/2011 | Koch | 307/115 |
| 2012/0049639 A1 | 3/2012 | Besore et al. | |
| 2012/0143387 A1* | 6/2012 | Indovina et al. | 700/297 |
| 2013/0124002 A1* | 5/2013 | Greene | G05B 15/02 700/296 |

OTHER PUBLICATIONS

European Search Report, Application No. 12151471.5-2210; May 3, 2012.

Communication dated Jan. 5, 2016 from the European Patent Office in counterpart application No. 12151471.5.

* cited by examiner

DEMAND RESPONSE ADAPTOR FOR CONNECTING A DEVICE TO A DEMAND RESPONSE SYSTEM OR HOME AUTOMATION SYSTEM

The current invention relates to a demand response adaptor for connecting a device to a demand response system according to the preamble of the first claim.

Demand response adaptors for connecting a device, for example a dishwasher, a tumble dryer, a washing machine, etc., to a demand response system, more specific active demand response, such as for example realized by INTELLIGATOR® (developed by VITO), are already known to the person skilled in the art. WO2011/064671A2 for example describes a demand response adapter for connecting a device to a demand response system or home automation system. The demand response adaptor comprises an electrical power input provided to receive electrical power from a power grid and an electrical power output provided to be connected to the device and provided to transmit the electrical power received through the electrical power input to the device electrically connected to the power output. The demand response adaptor further comprises a relay switch provided to control the flow of electrical power from the electrical power input to the electrical power output. The relay switch is switchable between a conductive state in which electrical power is allowed from the electrical power input to the electrical power output and a nonconductive state in which electrical power from the electrical power input to the electrical power output is not allowed. A controller connectable to a demand response control system is further provided to make a decision, depending on first constraints provided by a user, such as for example a maximum price, and third constraints depending on availability of electrical power provided by the demand response system, such as for example the price of the electrical power, whether electrical power should be allowed to the device. The controller is connected to the relay switch such that the controller can switch the relay switch between the conductive state and the nonconductive state depending on the decision of the demand response control system. In such a device, the demand response control system based on the price of the electric power, a maximum price indicated by the user, decides when to switch the relay switch such that, for example, the smallest price is paid for a specific task.

The controller comprises a database connection connected to a database of second constraints, being the memory. The second constraints depend on the device connected to the demand response adapter through the electrical power output.

It is envisaged that demand respond systems will become widely deployed in the near future. However, much of the currently used devices are not yet adapted at being used with such a demand response system as they do not comprise a demand response adaptor with a demand response control system. Replacing the old devices with new devices comprising such a demand response adaptor, while many of the devices still operate according to satisfaction, is not desired.

However, although the known demand response adapter allows control of the supply of electrical power to a device based on the price of the electrical power, the demand response adapter does not take specifications depending on the device connected to the demand response adapter through the electrical power output into account and merely switches between the conductive state and the nonconductive state based one the price of the electrical power.

This is however not always desirable. When devices such as washing machines, a dishwasher, a tumble dryer, etc. are connected to the demand response adaptor, it is often desired that, when started, a program is fully executed before switching back to the nonconductive state.

Therefore, it is an object of the current invention to provide a demand response adaptor which can be connected to such a device for making the device operable in a demand response system taking into account the specifications depending on the device connected to the demand response adapter through the electrical power output.

This is achieved according with the demand response adaptor according to the characterizing part of the first claim.

Thereto, the demand response adaptor is configured such that
  the database connector is connectable, and preferably, more preferably in use, is connected, to a database of the second constraints such that, depending on the device connected to the demand response adapter, the demand response control system can be provided with the second constraints corresponding to the device connected to the demand response adapter,
  the demand response control system comprises software components to make the decision based on the first, the third and the second constraints,
  the controller comprises software components to detect the start of a program by the device by analyzing the amount of electrical power used by the device in function of time detected by the sensor and
  the controller of the adaptor comprises software components to switch the relay to the nonconductive state when the start of the program is detected until, based on the decision of the demand response control system, the controller switches the relay switch to the conductive state for completing execution of the specific program.

It has been found that with such a demand response adaptor, existing devices can be adapted to be used in connection with a demand response system taking into account the specifications depending on the device connected to the demand response adapter through the electrical power output. Since the controller is connectable to a database of second constraints for different devices, all the devices of which the second constraints are provided in the database, can be transformed to a device which can connect to a demand response system.

Since the controller comprises software components to detect the start of a program by the device by analyzing the amount of electrical power used by the device in function of time detected by the sensor, it has been found that the start of a program can be detected very quickly and that the program can, for example, be interrupted very quickly, avoiding that some parts of the program are already performed, making further continuation of the program after the relay switch has been switched to the conductive state for completing execution of the specific program difficult or even impossible. Response times for detecting start of the program of the device and switching the relay switch to the conductive state have been detected in the microsecond range.

By detecting the start of a program by the device by measuring the amount of electrical power used by the device in function of time detected by a sensor, a simple method is provided for which, without having to know a lot of detail of the device connected to the demand response adaptor, the device, more in particular the execution of the specific program, can be put on hold until, based on the decision of the demand response control system, the controller switches the relay switch to the conductive state for completing execution of the program after that the demand response control system has found a preferable time window in which the device can finish the specific program. The demand response control system thus allows to take into account the power needed for executing the program and allows the demand response control system to take into account the execution of the program into account thereby planning power usage in correlation with other devices and/or the price of the electric power and/or the availability of the renewable energy and/or the capacity constraints of the distribution grid.

According to more preferred embodiments of the current invention, the sensor for measuring the amount of electrical power used by the device in function of time is a current sensor. Such sensors, known in the art, are readily available and can be easily connected to the controller. Although a current sensor is preferred because they are cheap, other sensors such as for example sensor allowing to measure current and voltage and/or a power measurement sensor.

According to preferred embodiments of the current invention, the controller comprises a network interface, for example for receiving the third constraints, as such constraints can be easily distributed over such a network, when the demand response control system is controlled by the controller or for receiving a signal reflecting the decision of the demand response control system when the demand response control system is not controller by the controller but is instead, for example, situated outside of the demand response control system.

Preferably, the demand response control system is not controller by the controller but is instead, for example, situated outside of the demand response control system. For such a configuration, different demand response control systems can be used with a single adaptor such that the adaptor is more independent of the demand response control system being used. On the other hand, should a demand response control system have to be adapted to the adaptor, the adaptation must only be done once, as the type of device connected to the adaptor according to the invention, does not have to influence the demand response control system.

It has been found that such an adaptor can be provided in a adaptor housing separate to the device housing of the device and thus separately encasing the adaptor from the device housing of the device, the adaptor housing for example comprising a, preferably standard, electrical connector at the electrical power output for receiving a, preferably standard, electrical plug of the device and a, preferably standard, plug at the electrical power inlet for being received in a, preferably standard, outlet.

According to preferred embodiments of the current invention, the first constraints comprise any one of the following: the time when the program should be finished, the time when the program should start, for example should start at the latest. Such parameters have been found useful for the demand response control system for participating in the demand response system. Preferably, the demand response adaptor comprises an interface for a user to input these first constraints. The interface can for example be in the form of buttons and for example a screen on the preferred adaptor housing of the demand response adaptor and/or can for example be in the form of a, preferably graphical, user interface which can be accessed by the user using a computer over a network, such as for example the Internet or an Intranet. Such a user interface can be provided on the demand response adaptor itself or on a server connected to the demand response adaptor.

The invention also relates to a device and demand response adaptor according to the invention connecting the device to a demand response system or home automation system, wherein the electrical power input is provided to receive electrical power from a power grid, the electrical power output is connected to the device and is provided to transmit the electrical power received through the electrical power input to the device electrically connected to the power output. Preferably, the controller of the demand response adapter is connected to a network through the network interface for example for receiving the third constraints, as such constraints can be easily distributed over such a network, when the demand response control system is controlled by the controller or for receiving a signal reflecting the decision of the demand response control system when the demand response control system is not controller by the controller but is instead, for example, situated outside of the demand response control system. The device preferably is a demand response participating device being a type of device which can be integrated into a demand response system and can for example be any one of the following: washing machine, tumble dryer, dishwasher.

According to preferred embodiments of the current invention, the database connector is connected to the database of second constraints and the second constraints relate to the usage of electrical power of the device, especially in function of time and for example comprise any one of the following: the duration of the longest program of the device, the amount of electrical power in function of time needed to perform a program, the amount of electrical power used by the device in function of time during the start of the program for detection of the start of the program by the controller. Such parameters have been found useful for the demand response control system for participating in the demand response as they especially allow the demand response control system to anticipate the usage of power of the device while executing the specific program, allowing a better prediction of power usage by the device which is beneficial when used in the demand response system. Although a user could program the second constraints into the adapter by, for example, selecting the device connected to the adaptor, the adaptor can also be provided to detect the device connected to it by analyzing the electric power used by the device in function of time. The database of second constraints can be provided to the adaptor in the form of a local memory, for example provided in the adaptor housing of the adaptor, but can also be provided on a server which the adaptor can access over a network, for example the Internet or an Intranet such as a home network, using a network interface.

Preferably, the demand response adaptor is provided to allow the user to indicate the device connected to the demand response adaptor, for example through the interface, discussed above, used for the first constraints.

According to preferred embodiments of the device and demand response adaptor according to the invention, the device is provided to be programmed to perform a program and in that the device is provided to continue the program when provision of power to the device is switched on again by the controller of the demand response adaptor by switching the relay from the nonconductive state to the conductive state after the program has been started in the conductive state of the relay and the relay is switched to the nonconductive state upon detection of the start of the specific program. According to such a demand response adapter and such a device, after programming the specific program, the power is cut-off by the demand response adaptor by switching the relay to the nonconductive state until the decision is made by the controller based on the first, second and third constraints to switch the relay back to the conductive state such that the device can start and proceed with the program, for example a tumble dryer starting a drying cycle, or continue the program which has previously been stopped, for example a washing machine having preformed a washing cycle which has stopped after the washing cycle and which is waiting to perform a spinning cycle, preferably until the device has completely finished the program.

The invention also relates to the use of the device and demand response adaptor according to the invention for connecting the device to a demand response system or home automation system. The electrical power input is connected to a power grid for receiving electrical power from the power grid and the database connector is connected to the database of second constraints. The use comprises the steps of:
- the demand response adaptor allowing transmittal of electrical power from the electrical power input to the electrical power output and to the device,
- the device starting a specific program,
- the controller detecting the start of the program of the device by analyzing the amount of electrical power used by the device in function of time detected by the sensor,
- the controller of the adaptor switching the relay to the nonconductive state when the start of the program is detected until, based on the decision of the demand response control system, the controller switches the relay switch to the conductive state for completing execution of the program and the device continues with the specific program.

According to preferred embodiments of the use according to the present invention, before starting the program the device is programmed to perform the specific program. This programming can be done mechanically or digitally, the last requiring electrical power.

The devices preferably are provided to perform batch-wise tasks limited in time, in the context of the current application called a program, such as for example a dishwasher, in which a program for example is the cleaning of a batch of dishes loaded into it, a washing machine, cleaning a batch of laundry loaded into to it, a tumble dryer, drying a batch of wet clothes loaded into to it, an oven, heating a batch of food loaded into it, a water cooker, etc. Devices such as for example a lightbulb, a television, a radio, an electric clock, etc. are designed to operate without delay and require instantaneously electrical power and therefore are less critical, or depending on the envisaged usage, even impossible, to be adapted to use with a demand response system.

Moreover, the devices are provided to perform or continue the program when provision of power to the device is restored by switching the relay switch from the nonconductive state to the conductive state. The program can for example be, in case of a washing machine, washing a batch of laundry at a certain temperature during a certain amount of time at a certain turning speed, etc.

According to preferred embodiments of the current invention, the adaptor is provided to switch the controller to the conductive state for allowing transmittal of electrical power from the electrical power input to the electrical power output such that the device can be programmed to perform the chosen specific program. According to such a demand response adapter, power can be supplied, for example briefly, to the device for programming it. In case of for example a washing machine, to for example program the washing program in function of for example the laundry loaded into the washing machine, after which the power is cut-off by the demand response adapter by switching the relay to the nonconductive state until the decision is made by the demand response control system based on the first, second and third constraints to switch the relay back to the conductive state such that the device can start or continue the program, until the device has finished the program.

According to preferred embodiments of the current invention, before starting the program the device is programmed to perform the specific program.

According to preferred embodiments of the current invention, the adaptor is adapted to be switched, for example by a further button or switch provided on the adaptor, between a state wherein the controller is functional in detecting the start of the program and a state wherein the controller has switched the relay switch to the conductive state such that electrical power is transmitted to the device connected to the adaptor. Such a configuration allows fore example that the user may decide to bypass the detection of the start of the device when the user whishes that power is transmitted to the device for example independent of the first, second and third constraints.

The invention will be further elucidated by means of the following description and the appended figures.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

The following numbers appearing in the figures in general refer to the following features:
1. Demand response adaptor
2. Electrical power input
3. Electrical power output
4. Relay switch
5. Controller
6. Sensor
7. Network interface
8. Adaptor housing
9. Display
10. Control Buttons
11. Single power peak
13. Minimal power
14. Period of time
15. Power supply FIG. 1 shows a front view of an embodiment of a demand response adaptor 1 according to the invention for connecting a device to a demand response system.

Figure 1:
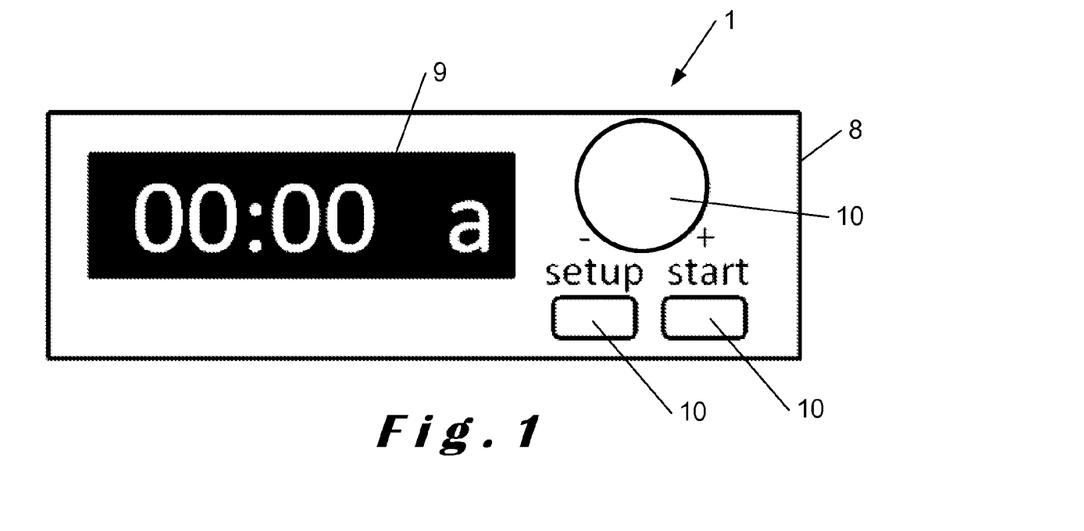
FIG. 1 shows a front view of an embodiment of a demand response adaptor according to the invention.

The demand response adaptor 1 shown in FIG. 1 comprises an adaptor housing 8 separately encasing the adaptor from the device housing of the device. An interface is provided for the user to, for example, input certain constraints. The interface for example comprises a display 9 providing the user of the demand response adaptor 1 with information and control buttons 10 with which the user in turn can provide the demand response adaptor 1 with information. For example, the buttons 10 can be manipulated such as to program the demand response adaptor 1 while the display 9 displays information on the program, such as for example an end time programmed by the user. After programming the demand response adaptor 1 the display 9 for example shows the status of the demand response adaptor 1.

In the embodiment shown in FIG. 1, the control buttons 10 comprise a rotary knob and two push buttons. This is however not critical for the invention and any type of button deemed appropriate by the person skilled in the art can be used. Possibly, the display 9 is even provided as a touch screen allowing to replace the buttons 10.

Figure 2:
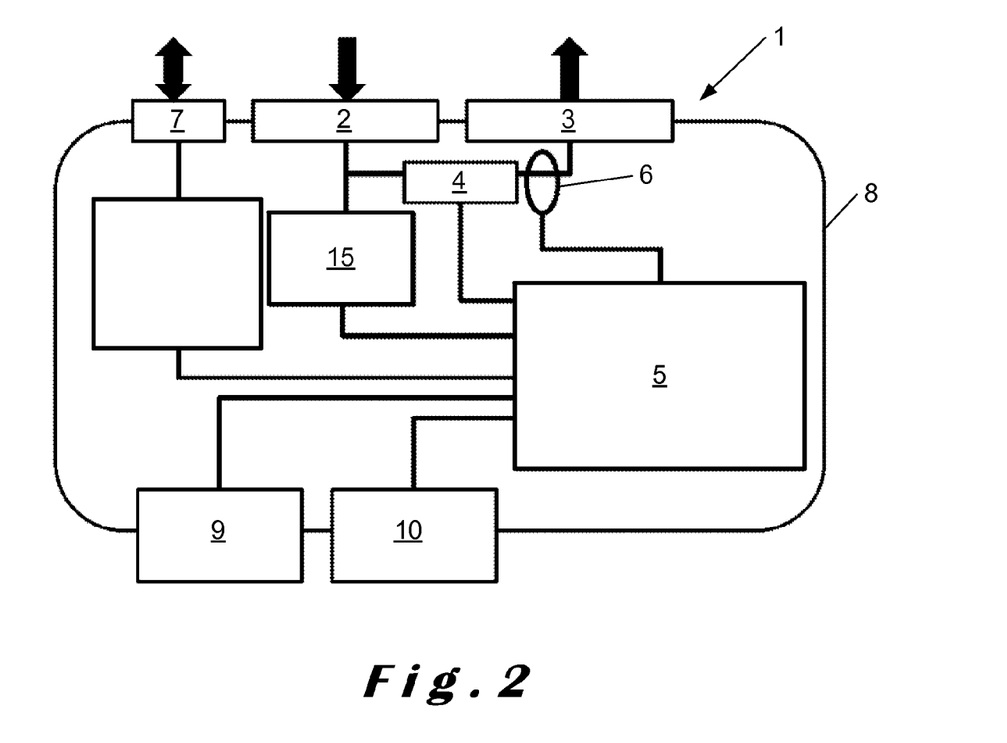
FIG. 2 shows a schematic top view of an embodiment of a demand response adaptor according to the invention.

FIG. 2 shows a schematic top view of an embodiment of a demand response adaptor 1 according to the invention.

The demand response adaptor 1 comprises an electrical power input 2. The electrical power input 2 is provided to receive electrical power from a power grid. Preferably, although not shown, the adaptor housing 8 of the adaptor 1 comprises a standard electrical plug at the electrical power input 2 for being received in a standard outlet.

The demand response adaptor 1 shown in FIG. 2 further comprises an electrical power output 3 provided to be connected to the device and provided to transmit the electrical power received through the electrical power input 2 to the device electrically connected to the power output 3. Preferably, although not shown in FIG. 2, the adaptor housing 8 comprises a standard electrical connector at the electrical power output 3 for receiving a standard electrical plug of the device.

As shown in FIG. 2 the electrical power input 2 and the electrical power output 3 are electrically interconnected with each other such that electrical power can be transferred from the input 2 to the output 3.

FIG. 2 further shows a relay switch 4 provided to control the flow of electrical power from the electrical power input 2 to the electrical power output 3 by being switchable between a conductive state allowing electrical power from the electrical power input 2 to the electrical power output 3 and a nonconductive state not allowing electrical power from the electrical power input 2 to the electrical power output 3. The relay switch 4 shown in FIG. 2 is for example provided as interrupting the electrical connection between the electrical power input 2 and the electrical power output 3.

FIG. 2 further shows that a controller 5 is provided to the demand response adaptor 1, for example in the form of a central processing unit (CPU and/or a microcontroller), such as for example an embedded microcontroller, for example powered by a power supply 15 connected to the electrical power input 2. The controller 5 is provided to be connected to a demand response control system and preferably is connected to the demand response control system. Thereto, the controller 5 for example comprises a demand response control system. The demand response control system is provided to make a decision, depending on first constraints provided by a user, second constraints depending on the device connected to the demand response adapter through the electrical power output 3 and third constraints depending on availability of electrical power provided by the demand response, whether electrical power should be allowed to the device. The controller 5 is connected to the relay switch 4 such that the controller 5 can switch the relay switch 4 between the conductive state and the nonconductive state depending on the decision of the demand response control system.

The controller 5 is connectable, and preferably is connected, to a database of second constraints such that, depending on the device connected to the demand response adapter, the demand response control system can be provided with the second constraints corresponding to the device connected to the demand response adapter.

Upon start of the performance of the program by the device, the device uses an amount of electrical power in function of time. The controller 5 of the demand response adaptor 1 thereto comprises a sensor 6, shown in FIG. 2, for measuring the amount of electrical power used by the device in function of time.

Figure 3A:
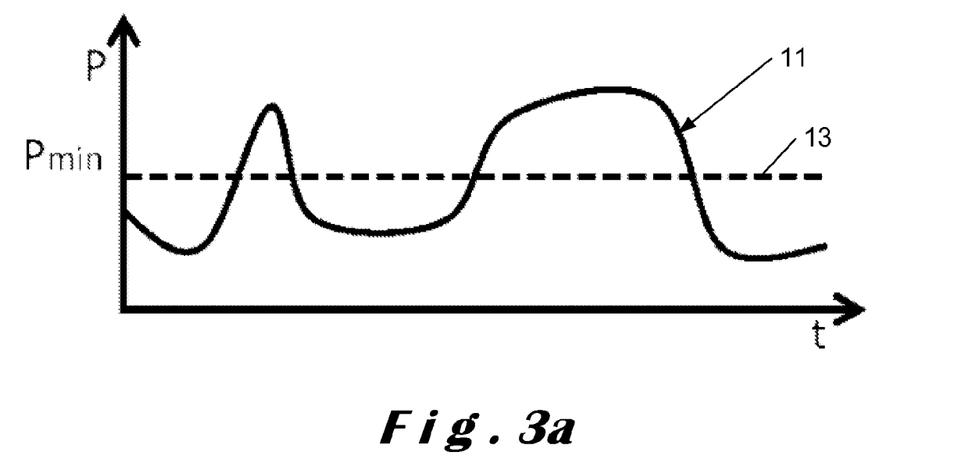
FIGS. 3a and 3b show graphs of electrical power used by a device in function of time.
Figure 3B:
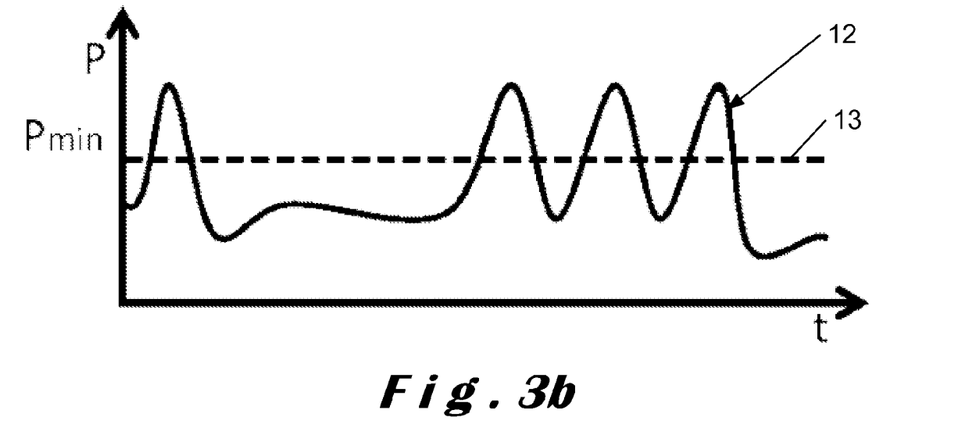

The sensor 6 can be any type of sensor deemed appropriate by the person skilled in the art, but preferably is a current sensor 6, such as for example a current clamp. FIGS. 3a and 3b show graphs of electrical power used by a device in function of time measured by such a sensor 6.

The controller 5 comprises software components to detect the start of the program by analyzing the amount of electrical power used by the device in function of time detected by the sensor 6.

The controller 5 comprises software components to detect the power in function of time as depicted in FIG. 3a and FIG. 3b each depicting a start of a specific type of device, FIG. 3a showing a device starting with a single power peak 11 and FIG. 3 showing a device starting with a pulse train 12. The controller 5 in such situations is for example adapted to detect the single power peak 11, for example by detecting when power is greater than a predetermined minimal power 13 or for example by detecting when power is greater than a predetermined minimal power 13 over a predetermined period of time. The controller 5 can also be provided to detect the pulse train 12, for example by determining the number of power peaks greater than a predetermined minimal power 13. The controller 5 is not limited to these two types of start sequences.

Preferably, the first constraints provided by the user relate to the desires of the user with respect to the execution of the program, especially with respect to the timing of the execution of the program, and for example comprise any one of the following: the time when the program should be finished, the time when the program should start. The time when the program should be finished or start can for example be programmed by the user using the buttons 10 and the display 9 shown in FIG. 1.

Figure 4:
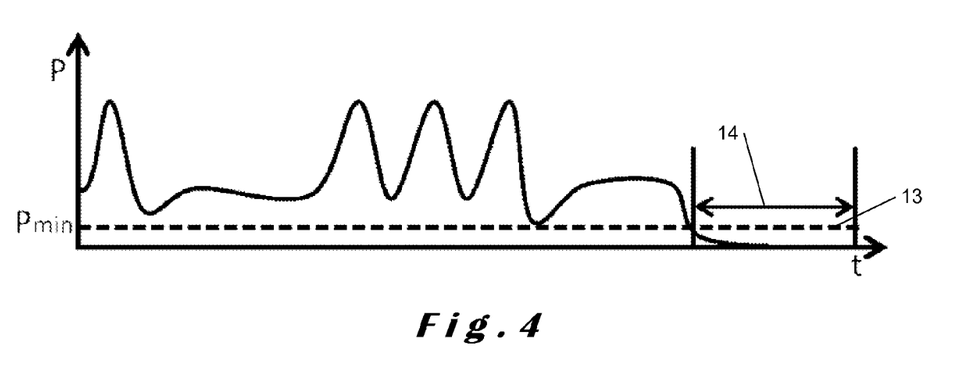
FIG. 4 shows another graph of electrical power used by a device in function of time.

Preferably, the database of second constraints comprises information on the amount of electrical power used by devices in function of time during the start of the specific program, such that the second constraints can be used by the controller 5 to detect the start of the program, especially if a specific device is selected by the user, preferably in the form of start detection patterns, such as for example parameters defining a minimal power 13 and a period of time 14 after which the device is considered to be off when the device uses less power than the minimal power 13 during this period of time, as is for example shown in FIG. 4. The database of the second constraints further preferably comprises parameters used for the detection, parameters for communicating with the demand response network and execution time of the longest program. For example the parameters for communicating with the demand response network, for example INTELLI-GATOR®, comprise the average power consumption of the device and the average length of a program running on the device. The demand response system used however is not critical for the invention and any type of demand response system can be used in combination with the adaptor, for example distributed or centralized demand response systems.

Preferably, the third constraints comprise any one of the following: variable energy price, local production of renewable energy, peak-saving systems, etc. Preferably, the third constraints relate to the availability of electrical energy, such as for example a price or distribution network constraints.

FIG. 4 shows another representation of electrical power used by a device in function of time. In this representation a complete program of the device is illustrated by showing the use of power in function of time.

FIG. 2 further shows that the controller 5 comprises a network interface 7 for receiving, for example, a signal reflecting the decision of the demand response control system. The controller 5 can also be connected to the database of second constraints through the network interface 7. The network interface 7 also can be provided to allow the user to input information in the demand response adaptor, such as the first constraints, for example through an interface as described above, more in particular a graphical user interface and/or to allow the user to input the specific device connected to the demand response adaptor. The network interface 7 is for example an ethernet interface via a RJ45 connector but can also be Zigbee, HomePlug, WiFi, etc.

In a typical case, the user programs the device to perform a specific program, a batch-wise task limited in time. For example, the user programs the washing machine to perform a specific wash cycle. Although the device can be analogue and be programmed by, for example, turning a timing knob, often the device is digital and needs electrical power to be programmed. Thereto, the adaptor has switched the controller 5 to the conductive state for allowing electrical power from the electrical power input 2 to the electrical power output 3 such that the device can be, for example digitally, programmed to perform the specific program. When the device starts the program, after programming by the user, for example when the user hits a start button on the device, the controller 5 of the adaptor switches the relay 4 back to the nonconductive state. Thereto, the controller 5 of the adaptor is provided, as the controller 5 comprises software components thereto, to detect the start of the program by the device and is provided to switch the relay 4 to the nonconductive state when a start of the program is detected. As the device is provided to perform the program when provision of power to the device is switched back on by the controller 5 of the demand response adaptor 1 by switching the relay 4 from the nonconductive state to the conductive state, the device will proceed with the program programmed by the user. The switching from the nonconductive state to the conductive state is controlled by the demand response control system and depends on the first, second and third constraints. Now the demand response adaptor will allow the device to end its program.

The invention claimed is:

1. A demand response adaptor configured to connect a device to a demand response system, comprising:
   an electrical power input configured to receive electrical power from a power grid;
   an electrical power output configured to be connected to the device and to transmit the electrical power received through the electrical power input to the device electrically connected to the power output;
   a relay switch configured to control the flow of electrical power from the electrical power input to the electrical power output by being switchable between a conductive state allowing electrical power from the electrical power input to the electrical power output and a nonconductive state not allowing electrical power from the electrical power input to the electrical power output; and
   a controller for connection to a demand response control system and configured to make a decision, depending on a combination of first constraints provided by a user and third constraints depending on availability of electrical power provided by the demand response system, whether electrical power should be allowed to the device, the controller being connected to the relay switch such that the controller can switch the relay switch between the conductive state and the nonconductive state depending on the decision of the demand response control system, wherein
   the controller comprises a database connector connectable to a database of second constraints depending on the device connected to the demand response adapter through the electrical power output,
   the controller of the demand response adaptor further comprises a sensor configured to measure the amount of electrical power used by the device in function of time, wherein the database connector is connectable to the database of the second constraints such that, depending on the device connected to the demand response adapter, the demand response control system is configured with the second constraints corresponding to the device connected to the demand response adapter, in that the demand response control system comprises software components configured to make the decision based on a combination of the first constraints, the second constraints and the third constraints, in that the controller comprises software components configured to detect the start of a program by the device by analyzing the amount of electrical power used by the device in function of time detected by the sensor and in that the controller of the adaptor comprises software components configured to switch the relay to the nonconductive state, in response to a detection of the start of the program, until, based on the decision of the demand response control system, the controller switches the relay switch to the conductive state configured to complete execution of the program, the first constraints comprise any one of the following: the time when the program should be finished, the time when the program should start, and the database connector is connected to the database of second constraints and in that the second constraints comprise any one of the following:

the duration of the longest program of the device, the amount of electrical power in function of time needed to perform a program, and the amount of electrical power used by the device in function of time during the start of the specific program.

2. The demand response adaptor according to claim 1, wherein the sensor, configured to measure the amount of electrical power used by the device in function of time, is a current sensor.

3. The demand response adaptor according to claim 1, wherein the controller comprises a network interface.

4. The demand response adaptor according to claim 1, wherein the adaptor comprises an adaptor housing separately encasing the adaptor from the device housing of the device.

5. The demand response adaptor according to claim 4, wherein the adaptor housing of the adaptor is configured to match the adaptor to the electrical power output and to receive an electrical plug of the device and a plug at the electrical power input configured to be received in an outlet.

6. The demand response adaptor according to claim 1, wherein the demand response adaptor is further coupled to the device and is configured to connect the device to a demand response system or a home automation system, and the electrical power input configured to receive electrical power from a power grid, the electrical power output being connected to the device and to transmit the electrical power received through the electrical power input to the device electrically connected to the power output.

7. The demand response adaptor according to claim 6, wherein the controller of the demand response adapter is connected to a network through a network interface, and wherein the controller comprises the network interface.

8. The demand response adaptor according to claim 6, wherein the device is any one of the following: washing machine, tumble dryer, dishwasher.

9. The demand response adaptor according to claim 6, wherein the device is configured to be programmed to perform the program and in that the device is configured to continue the program when provision of power to the device is switched on again by the controller of the demand response adaptor by switching the relay from the nonconductive state to the conductive state after the program has been started in the conductive state of the relay and the relay is switched to the nonconductive state upon detection of the start of the program.

10. The demand response adaptor according to claim 1, wherein the device is connected to the demand response system through a network connection.

11. The demand response adaptor according to claim 1, wherein the second constraints further comprise both a duration of the program and electrical characteristics of the program.

12. The demand response adaptor according to claim 1, wherein the decision of the demand response system comprises a decision that the electrical power is less expensive than at the detection of the start of the program.

13. The demand response adaptor according to claim 1, wherein the adaptor is further configured to automatically switch the relay to the nonconductive state, in response to a detection of the start of the program.

14. The demand response adaptor according to claim 1, wherein the adaptor is further configured to automatically switch the relay to the nonconductive state, in response to a detection of an electrical pattern of power consumed with respect to time generated by the device at the start of the program.

15. The demand response adaptor according to claim 1, wherein the second constraint is a duration of a longest program of the device.

16. The demand response adaptor according to claim 1, wherein the second constraint is a duration of the program of the device.

17. A method of using the demand response adaptor of claim 1 configured to connect a device to a demand response system, the method comprising:

connecting an electrical power input to a power grid to receive electrical power from the power grid;

connecting a database connector to a database of second constraints;

allowing transmittal of electrical power from the electrical power input to the electrical power output and to the device;

detecting a start of a program of the device by analyzing the amount of electrical power used by the device in function of time detected by a sensor;

switching a relay to the nonconductive state, in response to a detection of the start of the program, until a controller switches the relay switch to the conductive state to complete execution of the program based on a decision of the demand response control system; and continuing with the program.

18. The method according to claim 17, wherein before starting the program the device is programmed to perform the program.

* * * * *